(12) United States Patent
Burkauskas

(10) Patent No.: US 11,441,552 B2
(45) Date of Patent: Sep. 13, 2022

(54) RECIPROCATING PISTON MACHINE WITH COOLING DEVICE

(71) Applicant: VOITH PATENT GMBH, Heidenheim (DE)

(72) Inventor: Marius Burkauskas, Zschopau (DE)

(73) Assignee: Voith Patent GmbH, Heidenheim (DE)

( * ) Notice: Subject to any disclaimer, the term of this patent is extended or adjusted under 35 U.S.C. 154(b) by 236 days.

(21) Appl. No.: 16/632,586

(22) PCT Filed: Jun. 7, 2018

(86) PCT No.: PCT/EP2018/064987
§ 371 (c)(1),
(2) Date: Jan. 21, 2020

(87) PCT Pub. No.: WO2019/015855
PCT Pub. Date: Jan. 24, 2019

(65) Prior Publication Data
US 2020/0240403 A1    Jul. 30, 2020

(30) Foreign Application Priority Data

Jul. 21, 2017 (DE) .................. 10 2017 116 562
Jul. 26, 2017 (DE) .................. 10 2017 116 870

(51) Int. Cl.
*F04B 39/06*   (2006.01)
*F04B 39/12*   (2006.01)
(Continued)

(52) U.S. Cl.
CPC ............ *F04B 39/06* (2013.01); *F04B 39/122* (2013.01); *F04B 39/125* (2013.01);
(Continued)

(58) Field of Classification Search
CPC ...... F04B 39/06; F04B 39/125; F04B 39/122; F04B 53/08; F04B 53/007; F16K 15/1825; F16K 15/1821
See application file for complete search history.

(56) References Cited

U.S. PATENT DOCUMENTS 2,449,408 A *  9/1948  Naab ................. F04B 39/064
                                                        417/432
3,986,798 A * 10/1976  Lindell ............... F04B 39/06
                                                        417/564
(Continued)

FOREIGN PATENT DOCUMENTS

CH         233934 A    12/1944
DE       2410705 A1     9/1975
(Continued)

OTHER PUBLICATIONS

Machine Translation of DE 102009012.*

*Primary Examiner* — Christopher S Bobish
(74) *Attorney, Agent, or Firm* — Laurence A. Greenberg; Werner H. Stemer; Ralph E. Locher

(57) ABSTRACT

A reciprocating piston machine for compressing a fluid, more particularly ambient air, for a compressed air system of a motor vehicle, includes a cylinder housing and a cylinder head constructed layer by layer and including a valve carrier element with an outlet valve, a chamber plate and a head plate with a pressure medium outlet. A cooling medium channel for cooling at least a partial region of the cylinder head and an outlet channel for connecting the outlet valve to the pressure medium outlet are provided and extend through components of the cylinder head, at least in portions. In order to improve the cooling, at least a partial portion of the cooling medium channel and a partial portion of the outlet channel are allocated to the cylinder housing.

12 Claims, 4 Drawing Sheets

(51) Int. Cl.
    *F04B 53/00*         (2006.01)
    *F16K 15/18*         (2006.01)
    *F04B 53/08*         (2006.01)

(52) U.S. Cl.
    CPC ............ *F04B 53/007* (2013.01); *F04B 53/08* (2013.01); *F16K 15/1821* (2021.08); *F16K 15/1825* (2021.08)

(56) References Cited

U.S. PATENT DOCUMENTS

| | | | | |
|---|---|---|---|---|
| 4,006,602 | A * | 2/1977 | Fanberg | F04B 39/06 62/113 |
| 4,968,222 | A * | 11/1990 | Gotou | F04B 39/06 417/243 |
| 6,116,874 | A * | 9/2000 | Nation | F04B 39/064 137/512 |
| 8,117,960 | B2 * | 2/2012 | Hartl | F04B 53/08 92/144 |
| 8,337,177 | B2 * | 12/2012 | Mezza | F04B 39/06 417/438 |

FOREIGN PATENT DOCUMENTS

| | | | | |
|---|---|---|---|---|
| DE | 2733089 | A1 * | 2/1979 | ............ F04B 39/064 |
| DE | 10138070 | A1 | 2/2003 | |
| DE | 10242544 | A1 * | 4/2004 | ............. F04B 39/06 |
| DE | 10242544 | A1 | 4/2004 | |
| DE | 102009012894 | A1 * | 9/2010 | ............ F04B 7/0053 |
| EP | 1963674 | | 9/2008 | |
| GB | 832177 | A | 4/1960 | |
| WO | 2007068463 | A1 | 6/2007 | |

* cited by examiner

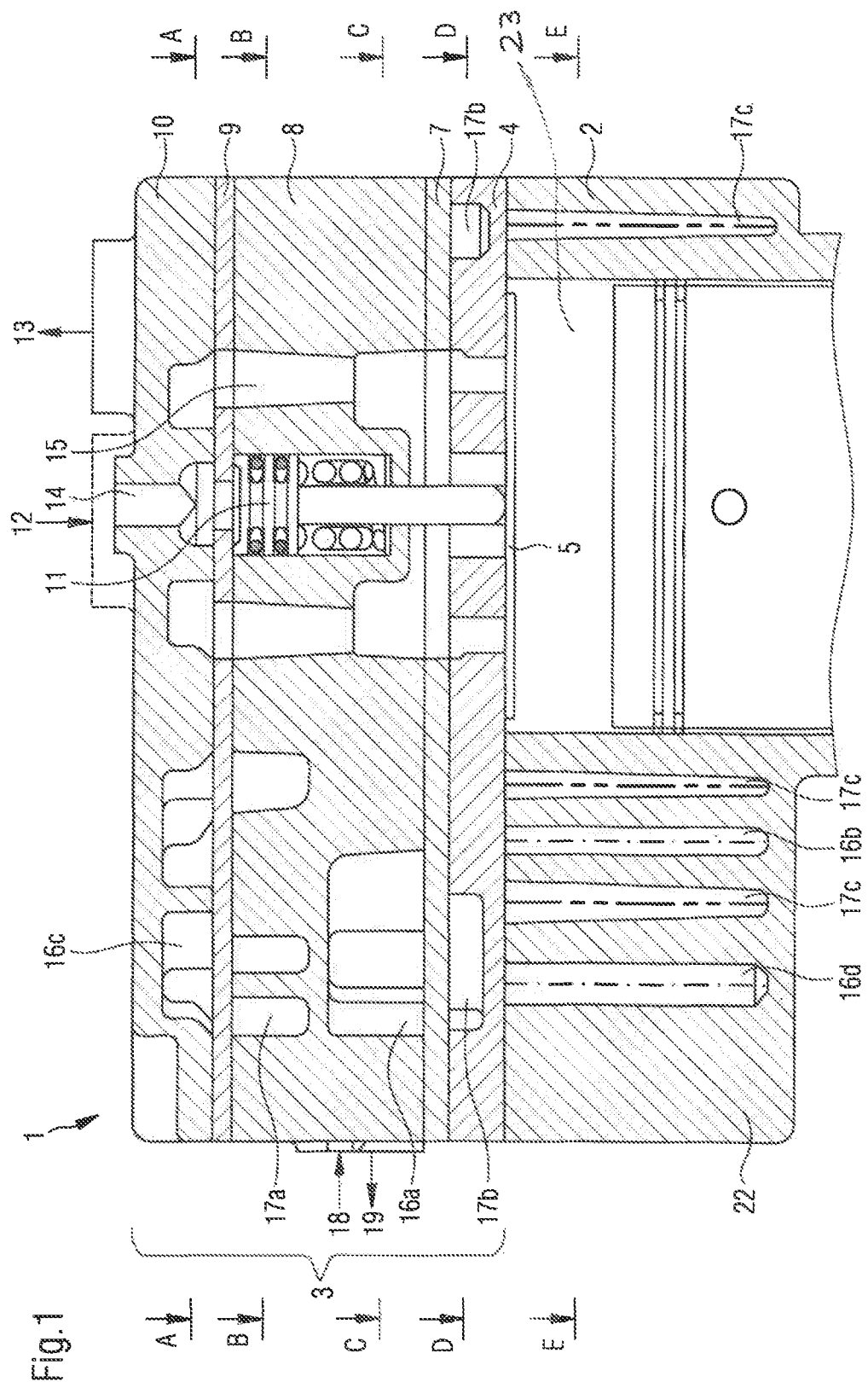

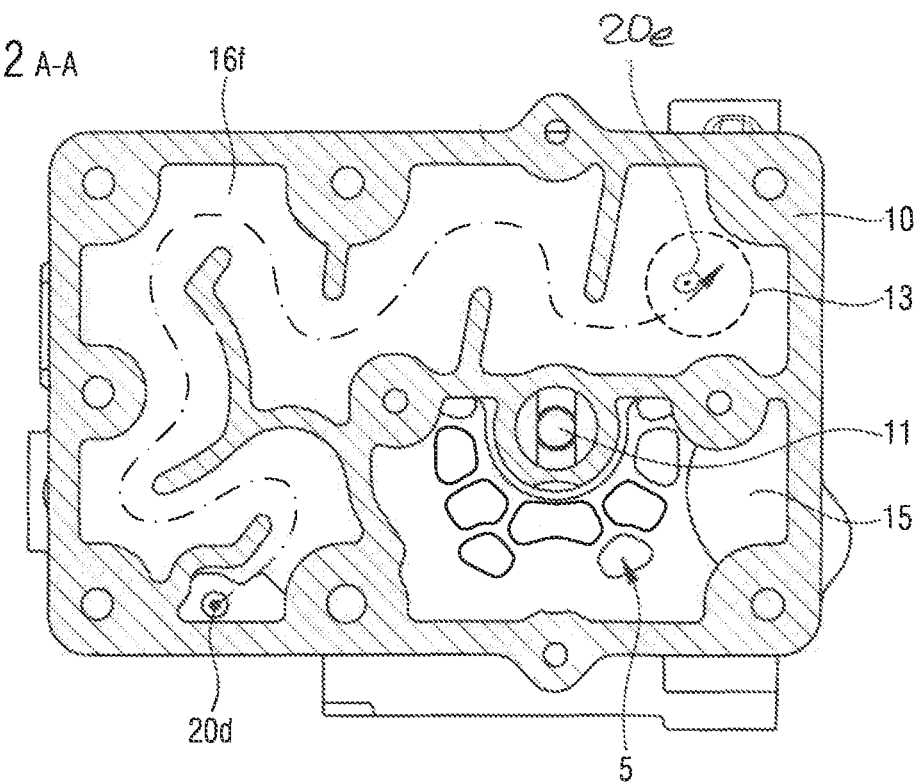
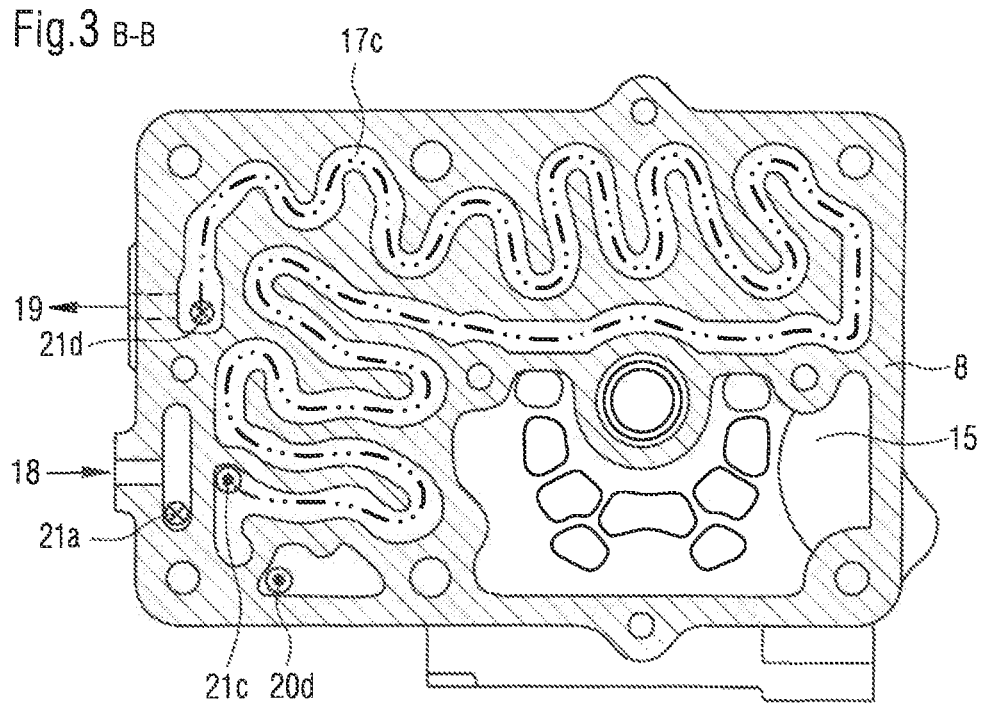

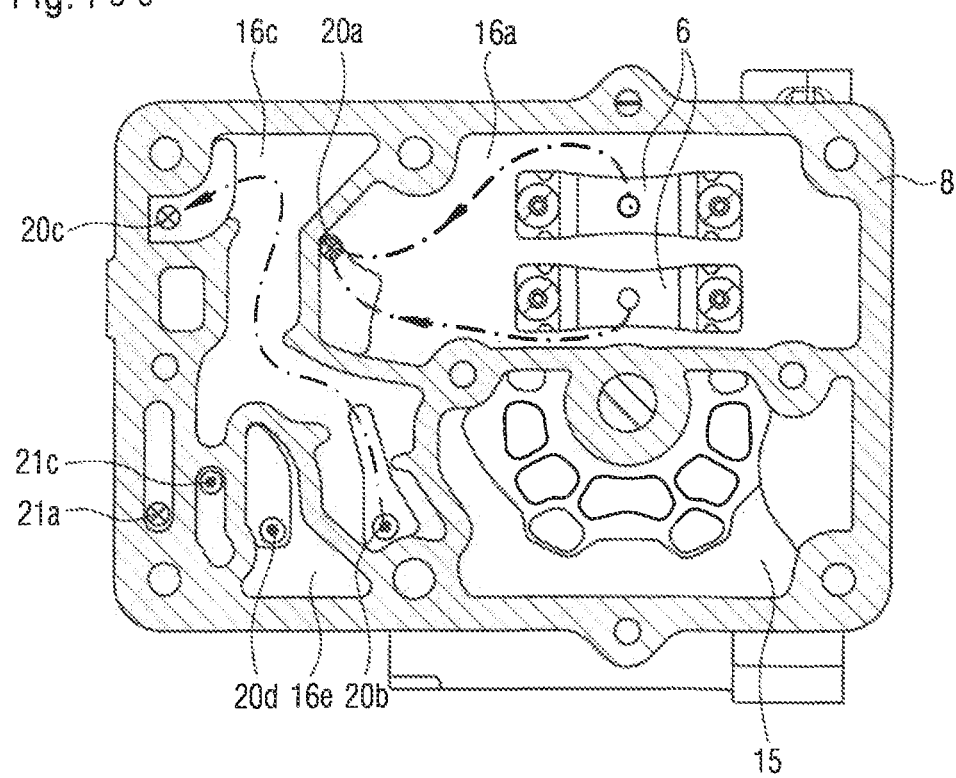
Fig.4 C-C
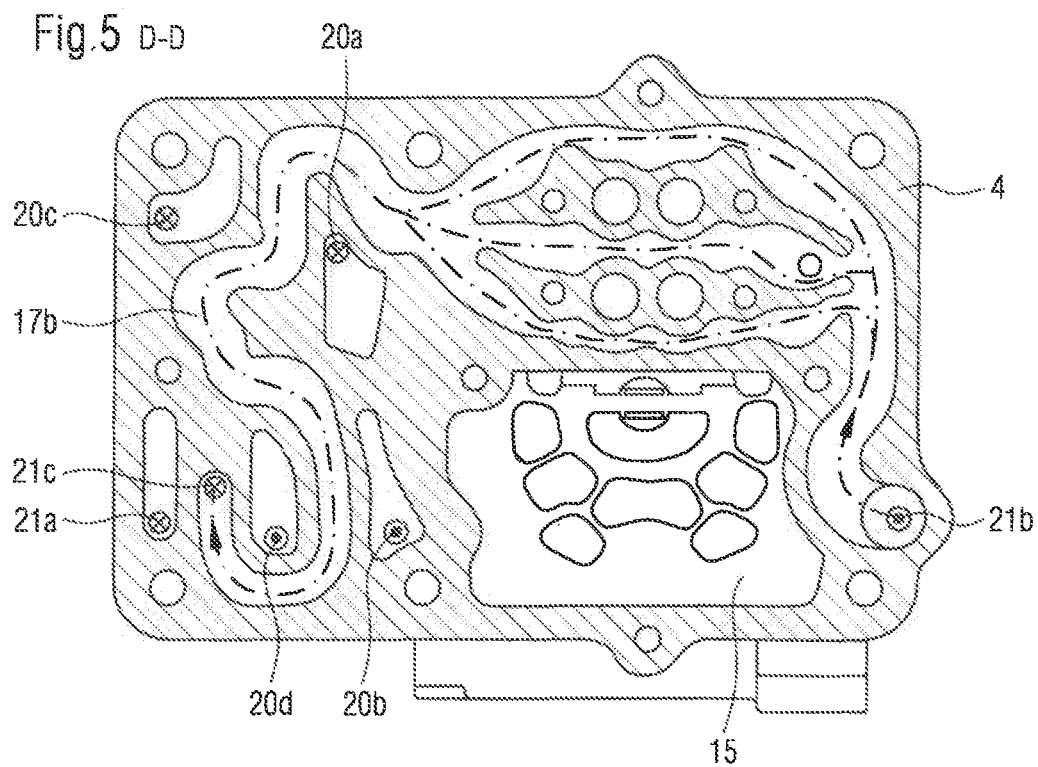
Fig.5 D-D

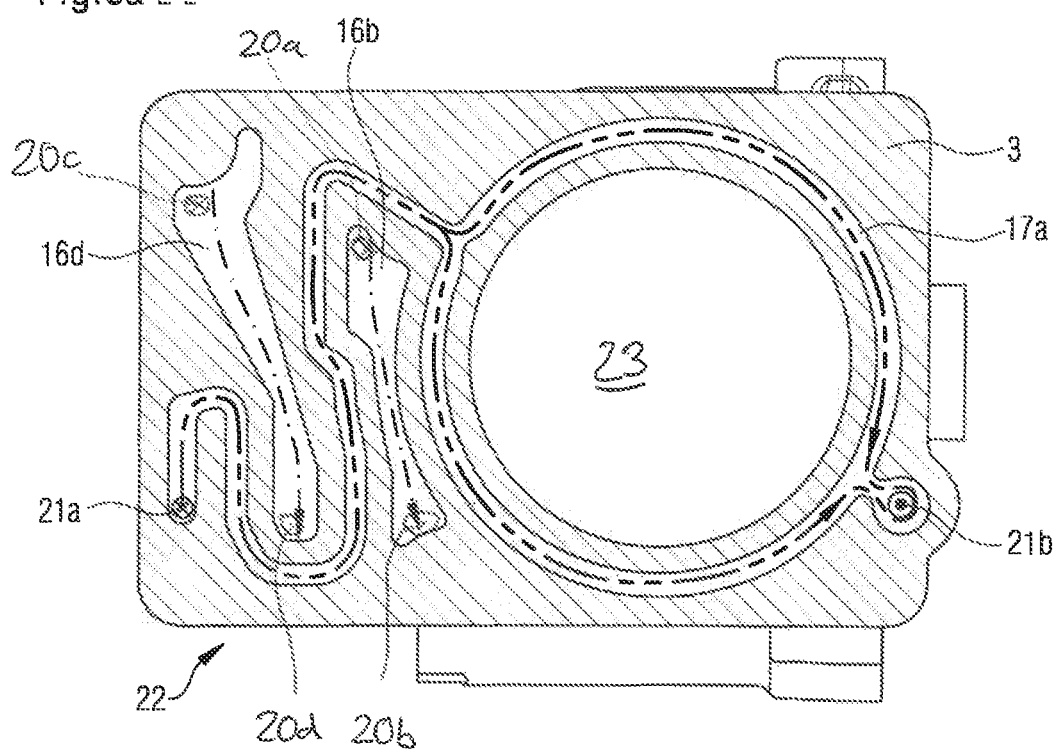
Fig. 6a E-E
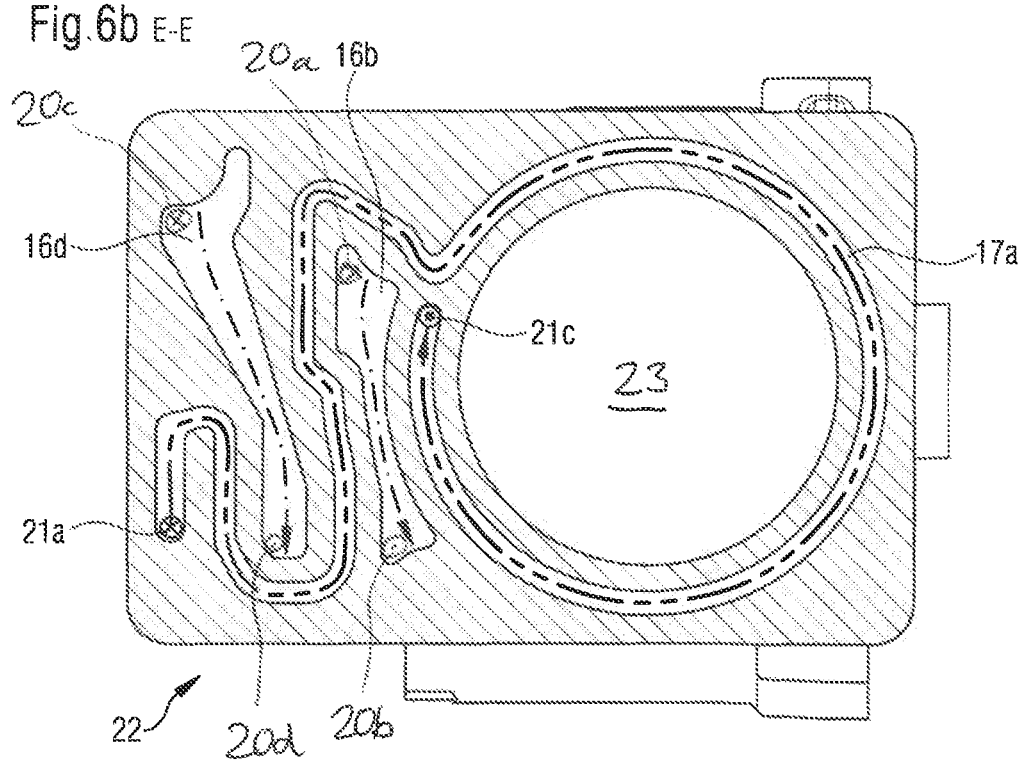
Fig. 6b E-E

RECIPROCATING PISTON MACHINE WITH COOLING DEVICE

BACKGROUND OF THE INVENTION

Field of the Invention

The invention concerns a reciprocating piston machine for compressing a fluid, in particular ambient air, for a compressed air system of a motor vehicle.

Such reciprocating piston machines are well known and comprise a cylinder housing, a piston which can be moved up and down in the piston space of the cylinder housing, and a cylinder head with a valve carrier plate. To cool the compressed air, a cooling channel is provided which runs through at least a partial region of the cylinder head.

To improve the performance of the compressor, it is particularly important to guarantee efficient cooling. The cooling has two main tasks. Firstly, the top dead center region or dead volume, i.e. the region between the valve carrier plate and the top piston position, must be cooled since the waste heat from compression is greatest here. Secondly, the compressed air must be cooled down before it can be conducted to the air conditioning system.

During operation, the greatest waste heat occurs in these regions. If the heat development in the top dead center region is too high, this means that the oil ejection rate is increased since the clearances between the piston rings and cylinder change unfavorably. The oil must then be extracted or separated again from the compressed air by means of an oil separator.

Various cooling concepts or cooling channel routes are known from the prior art. EP 1 963 674 A1 discloses a cylinder housing which has a cooling water channel assigned to the cylinder housing with a cooling water port, wherein the cooling water channel runs in regions through the cylinder head.

Furthermore, EP1 963 674 A1 discloses a crankcase cooling system which improves the flow around the crankcase on both sides.

DE 2 410 705 A1 furthermore discloses a water-cooled valve seat plate.

SUMMARY OF THE INVENTION

One of the objects of the invention is to provide an alternative improved structure of the cylinder head region of a reciprocating piston machine which allows more efficient cooling and improves the efficiency of the compressor.

According to the invention, this object is achieved with a reciprocating piston machine described below. Further advantageous embodiments and preferred solution variants are described in the dependent subclaims.

According to the invention, a reciprocating piston machine is proposed for compressing a fluid, in particular ambient air, for a compressed air system of a motor vehicle, said machine having an improved cooling concept.

In the context of the invention, improvement of the cooling concept is not restricted to the routing of the cooling channel.

Starting from a known reciprocating piston compressor, the reciprocating piston compressor according to the invention also comprises a cylinder housing and a cylinder head constructed in layers. This cylinder head comprises a valve carrier element with an outlet valve, a chamber plate and a head plate with a pressure medium outlet, wherein a cooling medium channel for cooling at least a partial region of the cylinder head, and an outlet channel for connecting the outlet valve to the pressure medium outlet are provided and extend at least in portions through components of the cylinder head.

To improve the cooling concept, it is provided that at least a partial portion of the cooling medium channel and a partial portion of the outlet channel are assigned to the cylinder housing. This means that the cooling medium channel through which the cooling water flows, and the outlet channel i.e. the channel through which the compressed air flows up to the compressor outlet, have partial portions which run through the cylinder housing or are at least substantially formed thereby. For example, these may be machined into the contact face to the cylinder head and closed by means of the valve carrier plate.

In a possible embodiment, the reciprocating piston machine may have a compressor stage with a reciprocating piston.

It may furthermore be provided that the connections of the cooling medium channel are arranged in the cylinder head region.

In a preferred embodiment, a heat exchanger region is provided in the cylinder housing, wherein at least a partial portion of the cooling medium channel and a partial portion of the outlet channel run through said region. The heat exchanger region is a region in which cooling and outlet channel portions are arranged alternately.

Furthermore, the heat exchanger region may be positioned in the cylinder housing such that at least a partial portion of the cooling medium channel and at least a partial portion of the outlet channel are formed by the cylinder housing and the valve carrier plate.

Thus the partial portion of the cooling medium channel and at least a partial portion of the outlet channel are arranged in a plane.

Furthermore, the cylinder head may have four planes, wherein each plane contains at least one channel which is a partial portion of the cooling medium channel or of the outlet channel so as to form a cooling plane or an outlet channel plane.

In a preferred embodiment, the cooling planes and the outlet channels planes are arranged in alternate layers, and the partial portions of the cooling medium channel or of the outlet channel are connected together via connecting channels.

Here, the channels may be formed as follows in the planes. At least a partial portion of the outlet channel may be delimited by the head plate and a separating plate. At least a partial portion of the cooling medium channel may be delimited by the separating plate and the chamber plate. At least a partial portion of the outlet channel may be delimited by the valve carrier element and the chamber plate. At least a partial portion of the cooling medium channel may be delimited by the valve carrier plate and the valve intermediate plate.

Furthermore, an inlet space may be provided in the cylinder head, which extends over all layer components and is separated from the cylinder space in the cylinder housing by means of a reed valve.

For actuation, a valve tappet may furthermore be arranged in the cylinder head, by means of which the reed valve can be lifted away from the valve carrier plate so that the inlet space and the cylinder space are connected, so that the reciprocating piston compressor can be set to an idling function.

The valve tappet may for example be moved into a first position by spring force, and into a second position, in which the reed valve is opened, by a pressure medium via the control air connection.

Further features of the reciprocating piston machine according to the invention, and further advantages of the invention, arise from the following description of preferred exemplary embodiments with reference to the drawings.

BRIEF DESCRIPTION OF THE SEVERAL VIEWS OF THE DRAWING

The invention is explained in more detail below with reference to sketches. These show:

FIG. 1 a section through the head region of a reciprocating piston machine according to the invention, FIG. 2 a section plane through the head plate with compressed air channel, FIG. 3 a section plane through the chamber plate with cooling channel, FIG. 4 a section plane through the chamber plate with compressed air channels, FIG. 5 a section plane through the valve carrier plate with cooling channel, FIGS. 6a,b a section plane through the cylinder housing with compressed air channels and cooling channels.

DESCRIPTION OF THE INVENTION

FIG. 1 shows a cross-section through the head region of a reciprocating piston machine 1 or compressor according to the invention. The figure shows the cylinder housing 2 with indicated cylinder, and the cylinder head 3. Such a compressor is suitable for compressing ambient air for the compressed air system of a motor vehicle.

One of the features of the single-stage compressor 1 shown is the heat exchanger region 22 arranged next to the cylinder space.

One basic problem with such compressors is that the air temperature rises ever further as the compression rises. The highest temperature is reached in the region of the top dead volume of the piston space, so that here there is a great need for cooling.

The cylinder head 3 of the compressor 1 is constructed in layers as shown, wherein a sealant or sealing element may be arranged between the layers in order to seal the components against each other. The valve carrier element, consisting of a valve carrier plate 4 and a valve intermediate plate 7, is arranged adjacent to the cylinder housing. The reed valve 5 is arranged on the valve carrier plate 4, and outlet valves 6 (shown in FIG. 4) are arranged on the valve intermediate plate 7. A cooling channel portion 17b is machined into the valve carrier plate 4, as also depicted in FIG. 5, section D-D.

The chamber plate 8 is arranged on the valve carrier element 4+7 and has two channel planes B-B and C-C, as explained in more detail below with reference to FIG. 3 and FIG. 4.

A head plate 8 with pressure medium outlet 13, and a separating plate 9 arranged between the head plate 10 and the chamber plate 8, terminate the structure. The separating plate thus delimits the cooling water channel 17a and the compressed air channel 17c, and also serves for heat transmission between planes A-A and B-B.

Since the air inlet 12 does not lie in the section plane, it is merely indicated here. The air drawn in through the air inlet 12 passes through the inlet space and the reed valve 5 to reach the piston space 23.

The figure also shows the valve tappet 11 arranged in the cylinder head, by means of which the reed valve 5 can be opened for idling operation. When actuated by means of compressed air, the valve tappet 11 moves the spring shown downward against the spring force and lifts the reed valve 5 at least partially away from the valve carrier plate 4. Thus a connection is created from the cylinder space 23 via the inlet space 15 to the air inlet 12, so that no compression can take place.

FIGS. 2 to 6 show the individual section planes so that the cooling planes and outlet channel planes are visible.

FIG. 2 shows the section plane through the head plate with a partial portion of the compressed air channel 16f. The air comes from below through the connecting channel 20e and is conducted through the labyrinth to the compressed air outlet 13.

The figure also shows the inlet space 15 and the position of the valve tappet 11, and the passage openings to the cylinder space 23 which are covered by the reed valve 5.

FIG. 3 shows a section plane B-B through the upper region of the chamber plate 8 with the partial portion of the cooling channel 17c. The cooling water passes through the cooling water inlet 18 into the cylinder head 3, from where it is conducted downward via the connecting channel 21a into the cylinder housing 2, then flows through plane E-E. From plane E-E, the cooling water passes through the connecting channel 21b into plane D-D, and from there back into plane B-B via the connecting channel 21c and on to the cooling water outlet 19.

FIG. 4 shows the section plane C-C through the lower region of the chamber plate 8 with the partial portion of the compressed air channels 16a and 16c. In this plane, it can be seen how the compressed air is conducted from the cylinder space 23 via the outlet valves 6 through the compressor 1. Via the connecting channel 20a, the air reaches plane E-E for the first time, from where it is conducted back into plane C-C via the connecting channel 20b in order then to be conducted over plane E-E for a second time via the connecting channels 20c and 20d. The air is conducted into plane A-A via the connecting channel 20d.

FIG. 5 shows a further section plane D-D through the valve carrier plate 4 with the cooling channel portion 17b.

FIGS. 6a, b show two optional designs of the section plane E-E through the cylinder housing 2. Here, the heat exchanger region 22 is very clearly seen. The cooling water channel 17a and the air channels 16b and 16d are arranged alternately. Thus coolant can flow around the cylinder region as depicted in the variants.

The particular advantage of this design is that in principle, two heat exchanger regions are formed. The heat exchanger region 22 in the cylinder housing 2, and the heat exchanger formed in the cylinder head from the layering of the planes. Viewed from above, air planes and cooling water planes are arranged alternately with each other. Because of the optimized cooling, the efficiency of the compressor is increased.

As an alternative to the cooling water route shown, the cooling water may also be conducted through the compressor in the opposite direction. To further increase the cooling capacity, studs/ribs or surface-enlarging coatings may be provided in the channels.

Furthermore, the design is not restricted to configuring the depth of the channels so as to remain in one plane, as shown in FIG. 1. The channel depth may also be configured such that the channels extend at least partially into an adjacent plane.

It is also conceivable that more or fewer planes are provided, wherein also two cooling water planes or air planes may be arranged adjacent to each other.

The depths or cross-sections of the channels are shown merely as examples in the figures. They may also be designed completely differently or formed by machining in two plates.

LIST OF REFERENCE SIGNS

1 Compressor
2 Cylinder housing
3 Cylinder head
4 Valve carrier plate
5 Reed valve
6 Outlet valve
7 Valve intermediate plate
8 Chamber plate
9 Separating plate
10 Head plate
11 Valve tappet
12 Air inlet
13 Compressed air outlet
14 Control air connection
15 Inlet space
16a, b, c . . . Outlet channel portions
17a, b, c Cooling water channel portions
18 Cooling water inlet
19 Cooling water outlet
20a, . . . Connecting channel for air
21a, . . . Connecting channel for water
22 Heat exchanger region
23 Piston space
A-A Section plane through head plate
B-B Section plane through chamber plate for cooling
C-C Section plane through chamber plate for compressed air
D-D Section plane through valve carrier plate
E-E Section plane through crankcase

The invention claimed is:

1. A reciprocating piston machine for compressing a fluid or ambient air for a compressed air system of a motor vehicle, the reciprocating piston machine comprising:
    a cylinder housing; and
    a cylinder head constructed in layers with outlet channel planes and cooling planes forming a first heat exchanger region, said cooling planes and said outlet channel planes being disposed in alternate layers, said cylinder head including a valve carrier element with an outlet valve, a chamber plate and a head plate with a pressure medium outlet;
    a cooling medium channel for cooling at least a partial region of said cylinder head and an outlet channel for connecting said outlet valve to said pressure medium outlet, said cooling medium channel and said outlet channel extending at least in portions through components of said cylinder head, said cooling planes and said outlet channel planes including at least one channel extending along said plane and being a partial portion of said cooling medium channel or of said outlet channel to form said cooling plane or said outlet channel plane respectively;
    said partial portions of said cooling medium channel or of said outlet channel being connected together by connecting channels formed in said layers;
    at least a partial portion of said cooling medium channel and a partial portion of said outlet channel being associated with said cylinder housing; and
    a second heat exchanger region provided in said cylinder housing, at least a partial portion of said cooling medium channel and a partial portion of said outlet channel running through said second heat exchanger region.

2. The reciprocating piston machine according to claim 1, which further comprises a compressor stage with a reciprocating piston.

3. The reciprocating piston machine according to claim 1, wherein said cooling medium channel has connections disposed in said cylinder head.

4. The reciprocating piston machine according to claim 1, wherein said second heat exchanger region positioned in said cylinder housing causes at least a partial portion of said cooling medium channel and at least a partial portion of said outlet channel to be formed by said cylinder housing and a valve carrier plate.

5. The reciprocating piston machine according to claim 1, which further comprises four planes provided in said cylinder head, each of said planes containing at least one of the channel being a partial portion of said cooling medium channel or of said outlet channel to form the cooling plane or the outlet channel plane.

6. The reciprocating piston machine according to claim 1, wherein at least a partial portion of said outlet channel is delimited by said head plate and a separating plate.

7. The reciprocating piston machine according to claim 1, wherein at least a partial portion of said cooling medium channel is delimited by a separating plate and said chamber plate.

8. The reciprocating piston machine according to claim 1, wherein at least a partial portion of said outlet channel is delimited by said valve carrier element and said chamber plate.

9. The reciprocating piston machine according to claim 1, wherein at least a partial portion of said cooling medium channel is delimited by said valve carrier plate and a valve intermediate plate.

10. The reciprocating piston machine according to claim 1, wherein an inlet space in said cylinder head has a length which extends over all of said components in said layers and is separated from a cylinder space in said cylinder housing by a reed valve.

11. The reciprocating piston machine according to claim 10, which further comprises a valve tappet disposed in said cylinder head for lifting said reed valve away from a valve carrier plate to interconnect said inlet space and said cylinder space.

12. The reciprocating piston machine according to claim 11, wherein said valve tappet is movable into a first position by spring force and is movable into a second position for opening said reed valve by a pressure medium from a control air connection.

* * * * *